Dec. 21, 1937.    H. M. SMITH    2,102,979
MOTOR VEHICLE SAFETY SEAT
Filed Nov. 26, 1934    2 Sheets-Sheet 1

INVENTOR
HARRY M. SMITH.
BY *Baldwin Vale*
ATTORNEY

Dec. 21, 1937.   H. M. SMITH   2,102,979
MOTOR VEHICLE SAFETY SEAT
Filed Nov. 26, 1934   2 Sheets-Sheet 2

INVENTOR
HARRY M. SMITH
BY
ATTORNEY

Patented Dec. 21, 1937

2,102,979

UNITED STATES PATENT OFFICE 2,102,979

MOTOR VEHICLE SAFETY SEAT

Harry M. Smith, San Francisco, Calif.

Application November 26, 1934, Serial No. 754,766

2 Claims. (Cl. 155—9)

This invention relates to improvements in motor vehicle safety seats.

The principal object of the invention is to prevent motor vehicle passengers from being hurled forward by momentum in the event of an impact or sudden application of the brakes.

Another object is to utilize the momentum of the occupants to deflect the lines of force and move the seat into a tilted position to guard against their being displaced therefrom.

Another object is to render the seat conventional in appearance when it is in normal position.

Another object is to arrange the structure so that it will be simple and reliable in operation and low in manufacturing cost.

Other objects and advantages appear as this description progresses.

In this specification and the accompanying drawings, the invention is disclosed in its preferred form. It is, however, to be understood that the invention is not limited to this form because it may be embodied in other forms without departing from the spirit of the invention as defined in the claims following the description.

Figure 1:
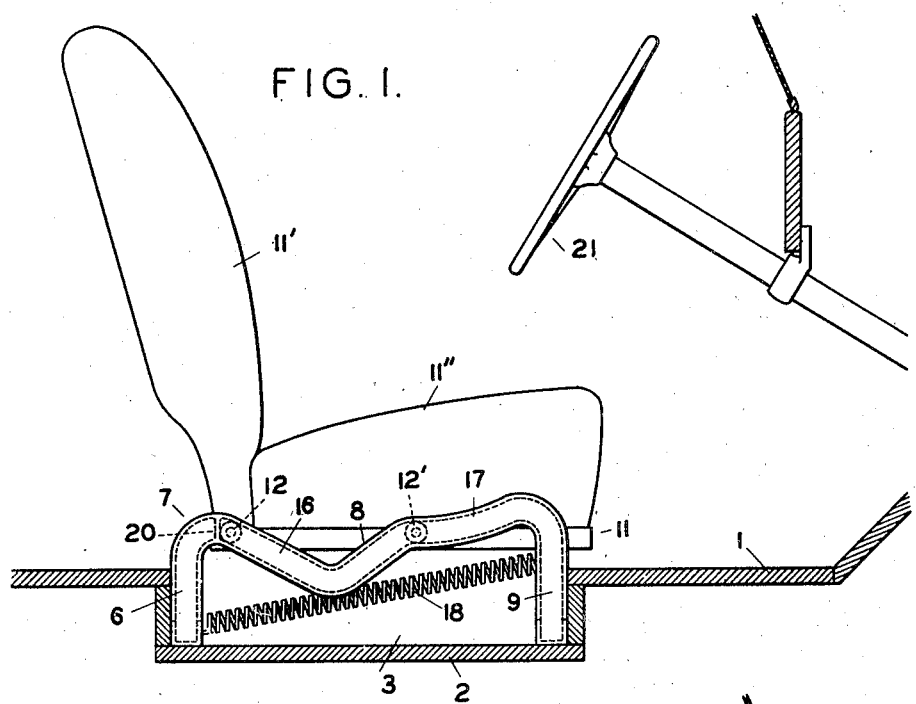
Fig. 1 is a diagrammatic side elevation of a motor vehicle seat constructed in accordance with this invention.
Figure 3:
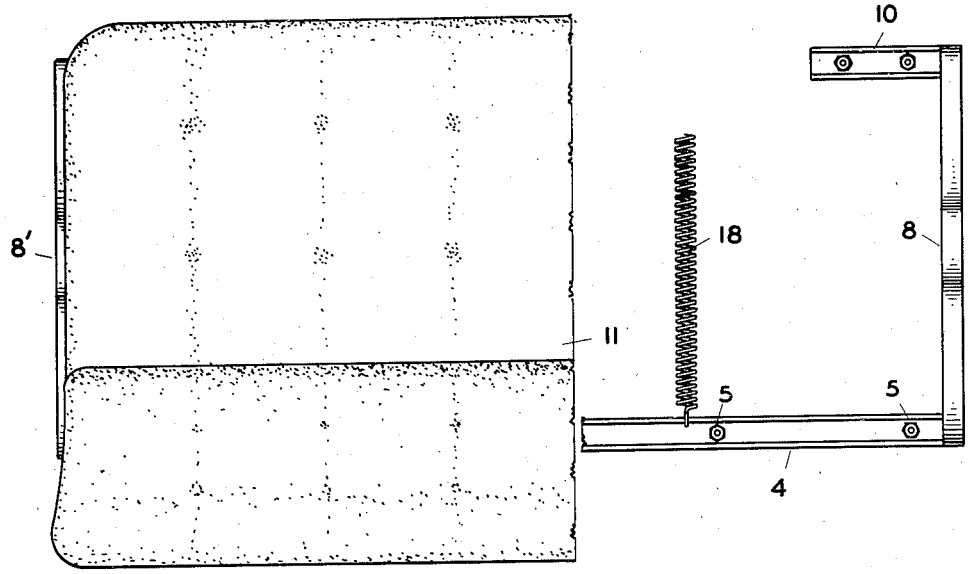
Fig. 3 is a plan view of the seat as in Fig. 1, partly broken away to disclose the underlying structure.

In detail the construction illustrated in the drawings, referring more particularly to Fig. 1, comprises the motor vehicle floor boards 1 and the baseboard 2 mounted at a lower level than the floor boards to form the recess 3. The channel iron 4, see Fig. 3, extends transversely across the recess 3 and is bolted to the base 2 at 5—5. The channel is bent upward at each end at 6, then longitudinally at 7 to form the guide rails 8, 8'. The forward ends of these rails are bent downward at 9 and transversely at 10 and bolted to the base 2 to form a rigid structure.

The seat 11 is of conventional construction and consists of the back 11' and the cushion 11'' upholstered in the usual manner. The cushion 11'' may be removable from the seat if desired.

Figure 4:
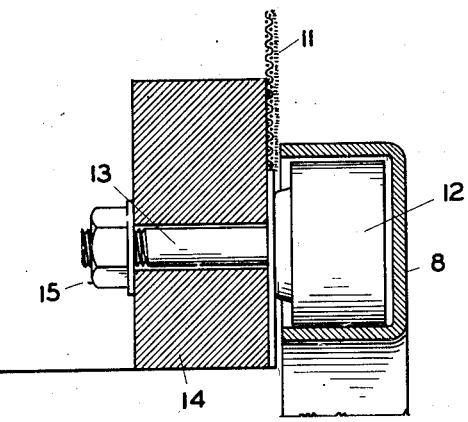
Fig. 4 is an enlarged detail in vertical section of one of the supporting rollers of the seat confined in its guiding channel.

The rollers such as 12, see Fig. 4, are preferably mounted on antifriction bearings and have the axial shanks 13 which extend laterally through the side struts 14 of the seat and are rigidly secured thereto by the nuts 15. The rollers 12 and 12', see also Fig. 1, are confined between the flanges of the guide rail 8 and support the seat 11. Similar rollers are fixed to the opposite side of the seat and confined in the rail 8'.

The guide rails 8 and 8' are both inclined downwardly at 16 and have a curvilinear rise at 17. When the seat is in normal position the roller 12 on opposite sides of the seat are situated at the top of the decline 16 while the rollers 12' rest at the beginning of the curvilinear rise 17 in the rails 8 and 8'. Contractile springs such as 18 are provided with their ends respectively engaging the central portion of the channel 4 and the lugs 19 which are fixed to the bottom of the seat 11. The tension of these springs urges the seat 11 backward into normal position with the rollers 12 resting against the stops 20 provided in the channels 8 and 8'.

Upon impact or upon too sudden application of the brakes, the momentum of the occupant carries the seat 11 forward against the tension of the springs 18. The rollers 12 then travel down the decline 16 and the rollers 12' progress up the curved rise 17 in the opposed rails 8 and 8'. This lowers the back and tips up the front of the seat to swing the seat into the position illustrated in Fig. 2.

The raised forward portion of the seat restrains the occupant from being hurled forward by the force of momentum. The lowering of the back 11' of the seat lowers the center of gravity and contributes to retaining the occupant in place on the seat.

Figure 2:
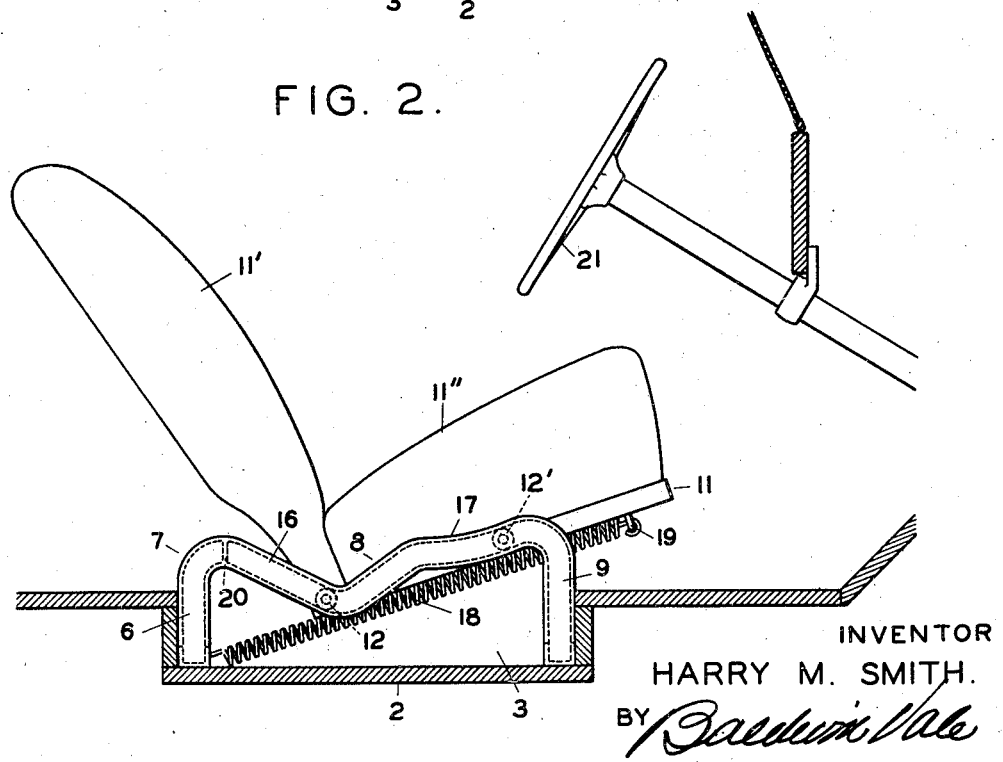
Fig. 2 is a similar view of the same in tilted position.

As shown in Fig. 2, the tilting movement carries the forward portion of the seat 11 a distance under the steering wheel 21. Sufficient space remains therebetween to clear the operator's knees.

The extent the seat 11 is tilted will vary with the force of momentum. The curvilinear rise at 17 and the increasing tension of the springs 18 as they expand progressively resist the force of momentum until it is expended. The springs 18 then restore the seat to its original position as in Fig. 1 with the rollers 12 engaging against the stops 20.

Having thus described this invention what we claim and desire to secure by Letters Patent is:

1. In a motor vehicle having a steering wheel; a pair of fixed longitudinal guides shaped to form alined relatively steep, forwardly disposed declines at the rear thereof and substantially horizontal portions at the front thereof; a seat between said guides having means at the rear thereof engaging the declines in said guides and means at the front thereof engaging the substantially horizontal portions of said guides; resilient means urging said seat backward; and a stop limiting the backward movement of said seat, said seat being adapted to be displaced forwardly against the tension of said spring by the force of momentum and tipped by said guides with its rearward portion lowered with respect to said steering wheel.

2. In a motor vehicle, a pair of fixed longitudinal channel guides shaped to form alined relatively steep, forwardly disposed declines at the rear thereof and substantially horizontal portions at the front thereof, a seat between said guides having antifriction rollers at the rear thereof confined in said channel guides in said declines and rollers at the front of the seat similarly confined in said channel guides in said horizontal portions; resilient means urging said seat backward; and stops in said guides adapted to be engaged by said rollers to limit the rearward movement of said seat; said seat being adapted to be displaced forwardly by the force of momentum and its rearward portion lowered by the rollers in said guides.

HARRY M. SMITH.